(12) United States Patent
Randjelovic et al.

(10) Patent No.: US 7,621,580 B2
(45) Date of Patent: Nov. 24, 2009

(54) AMBULANCE SEATING SYSTEM

(75) Inventors: John Randjelovic, Appleton, WI (US);
Jesse Knoble, Oshkosh, WI (US); Jeff Schwyn, Oshkosh, WI (US); Matt Schreiner, Oshkosh, WI (US)

(73) Assignee: Pierce Manufacturing Company, Appleton, WI (US)

( * ) Notice: Subject to any disclaimer, the term of this patent is extended or adjusted under 35 U.S.C. 154(b) by 322 days.

(21) Appl. No.: 11/503,386

(22) Filed: Aug. 10, 2006

(65) Prior Publication Data

US 2008/0036232 A1 Feb. 14, 2008

(51) Int. Cl.
*B60N 2/06* (2006.01)
(52) U.S. Cl. .................................. 296/65.13
(58) Field of Classification Search ............. 296/65.13, 296/63, 64, 65.01, 66, 68.1, 65.02, 65.14, 296/65.15, 19, 37.8, 37.15
See application file for complete search history.

(56) References Cited

U.S. PATENT DOCUMENTS

| | | | | |
|---|---|---|---|---|
| 1,223,592 | A * | 4/1917 | Leslie et al. | 296/19 |
| 2,718,256 | A | 9/1955 | Carte | |
| 4,458,939 | A * | 7/1984 | Hohn | 296/164 |
| 4,483,499 | A * | 11/1984 | Fronk | 244/118.1 |
| 4,740,030 | A * | 4/1988 | Nordskog | 297/13 |
| 5,236,390 | A * | 8/1993 | Young | 454/95 |
| 5,632,521 | A * | 5/1997 | Archambault et al. | 296/65.13 |
| 5,727,353 | A * | 3/1998 | Getz et al. | 52/79.1 |
| 6,460,922 | B1 * | 10/2002 | Demick | 297/14 |
| 7,270,371 | B2 * | 9/2007 | Adragna et al. | 297/14 |

FOREIGN PATENT DOCUMENTS

| | | |
|---|---|---|
| JP | 2004-236748 A | 8/2004 |
| JP | 2005-271699 A | 10/2005 |

OTHER PUBLICATIONS

International Search Report and Written Opinion for International Application No. PCT/US2007/075617, date of mailing Mar. 27, 2008, 13 pages.

* cited by examiner

*Primary Examiner*—H Gutman
(74) *Attorney, Agent, or Firm*—Foley & Lardner LLP

(57) ABSTRACT

An emergency response type vehicle is provided. The vehicle comprises an operator compartment, a body supported rearward of the operator compartment and having at least one side wall, a guide structure supported at the side wall and extending substantially parallel with the side wall, and a seat assembly movably coupled to the guide structure. The seat assembly has a backrest that is substantially parallel with the side wall. The seat assembly is selectively positionable about the guide structure to provide a movable (e.g., repositionable, reconfigurable, adjustable, adaptable, etc.) seating system within the vehicle so that an attendant can access different areas of the vehicle while remaining seated and restrained in a seat assembly.

24 Claims, 14 Drawing Sheets

AMBULANCE SEATING SYSTEM

BACKGROUND

The present application relates generally to the field of seating systems comprising one or more structures for supporting a vehicle occupant. More specifically, the present application relates to a seating system suitable for use within an emergency response-type vehicles (e.g., ambulance, firefighting vehicle, anti-terrorist vehicle, etc.).

Seating is provided within the body of an emergency response-type vehicle (e.g., ambulance, etc.) for one or more emergency workers or attendants (e.g., respondents, emergency medical technicians (EMTs), paramedics, firefighters, police officers, caregivers, etc.) who must administer aid or otherwise attend to patients being transported. During transit, patients are generally supported on a fixed cot or stretcher supported within the vehicle and the attendant often needs to access different parts of a patient's body. Conventional seating is relatively fixed within the vehicle thereby requiring the attendant to leave the seat to move around the vehicle in order to attend to the patient. Once out of the seat, the attendant may have difficulty maintaining his or her balance when the vehicle has to change speeds or turn quickly. However, if the attendant remains seated, the area accessible to the attendant is limited to the area proximate to the seat.

Accordingly, there is a need for a seating system having an attendant support structure that is moveable (e.g., repositionable, reconfigurable, adjustable, adaptable, etc.) within a vehicle to allow an attendant to access different areas of the vehicle while remaining seated and/or restrained in a seat.

SUMMARY

One embodiment of the invention relates to a seating system for an emergency response type vehicle. The seating system comprises a track and a seat movably coupled to the track. The seat has a backrest, a first lateral side and a second lateral side. The backrest is substantially parallel to the track. The seating system further comprises a platform supported at the first lateral side of the seat and configured to move between a first position and a second position. The seat is selectively movable about the track and is configured to occupy a space previously occupied by the platform when the platform is moved to the second position.

Another embodiment of the invention relates to an emergency response vehicle. The emergency response vehicle comprises an operator compartment, a body supported rearward of the operator compartment and having at least one side wall, a guide structure supported at the side wall and extending substantially parallel with the side wall, and a seat assembly movably coupled to the guide structure. The seat assembly has a backrest that is substantially parallel with the side wall. The seat assembly is selectively positionable about the guide structure.

Another embodiment of the invention relates to an emergency response vehicle. The emergency response vehicle comprises a body defined at least in part by a base and a side wall, a storage compartment supported at the base along the side wall, a guide supported above the storage compartment and extending in a direction that is substantially parallel with the side wall, and a first attendant support structure coupled to the guide and supported at a height that is above the storage compartment. The first attendant support structure is selectively movable about the guide to a position wherein the first attendant support structure is directly above the storage compartment.

Another embodiment of the invention relates to an emergency response vehicle. The emergency response vehicle comprises a body defined at least in part by a headliner and a side wall, a storage compartment supported at the headliner along the side wall, a guide supported below the storage compartment and extending in a direction that is substantially parallel with the side wall, and an attendant support structure coupled to the guide below the storage compartment. The attendant support structure is selectively movable about the guide.

Another embodiment of the invention relates to an emergency response vehicle. The emergency response vehicle comprises a body defined at least in part by a side wall, a guide extending substantially parallel with the side wall, an attendant support structure movably coupled to the guide, and a bench supported at a lateral side of the seat and configured to move between a use position and a stowed position. The attendant support structure is selectively movable about the guide and is configured to occupy a space previously occupied by the platform when the platform is moved to the second position.

DETAILED DESCRIPTION

Figure 1:
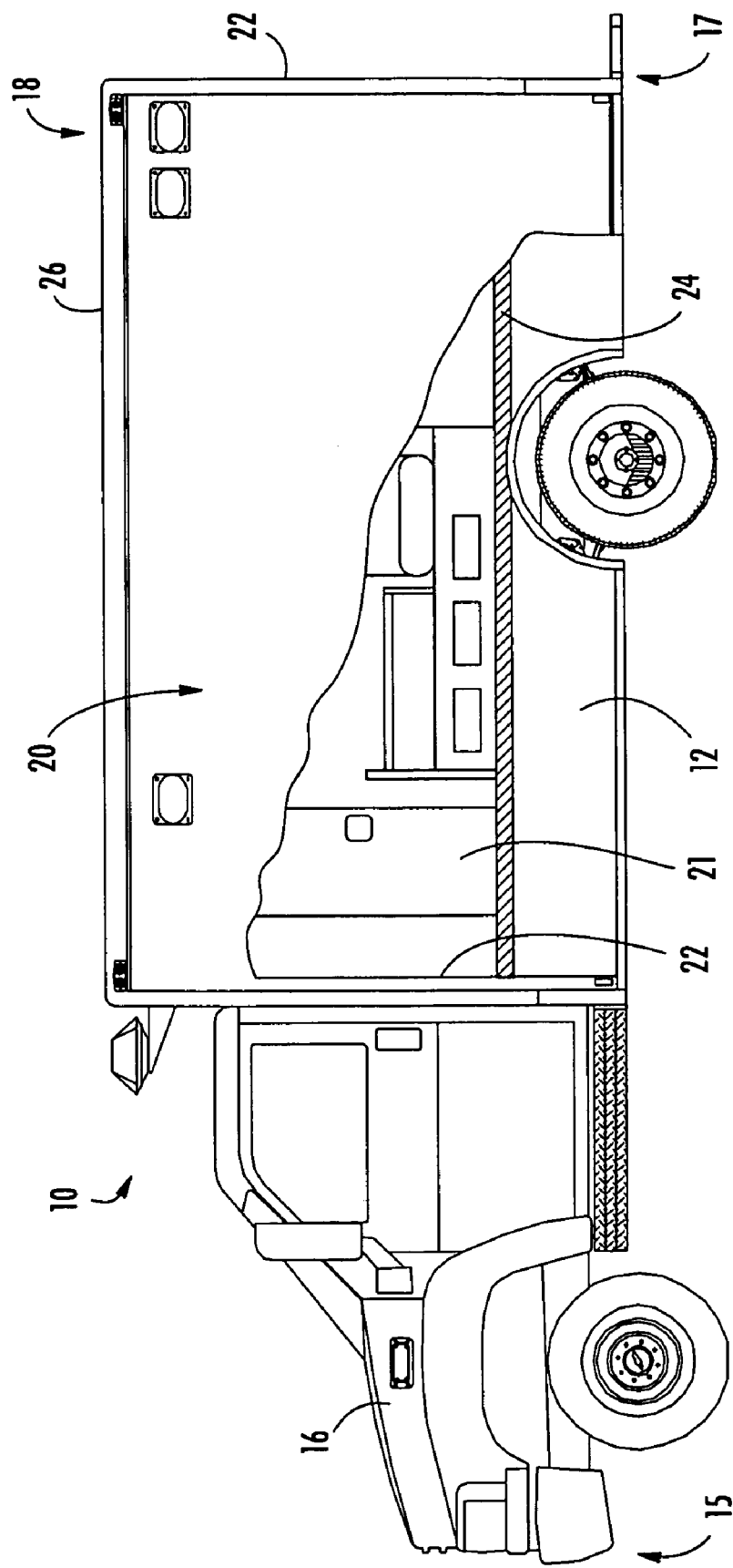
FIG. 1 is a schematic view of an ambulance according to an exemplary embodiment.

Referring generally to the FIGURES, a vehicle and components thereof are shown according to exemplary embodiments. The vehicle is an emergency response-type vehicle, shown as an ambulance 10, which is configured to transport one or more patients, one or more emergency workers or attendants (e.g., respondents, emergency medical technicians (EMTs), paramedics, firefighters, police officers, caregivers, etc.), and/or various articles useful in administering aid to the one or more patients. Ambulance 10 generally comprises a chassis, an operator compartment supported at a front portion of the chassis, a body supported rearward of the operator compartment, and a seating system provided within the body.

The seating system provides a movable (e.g., repositionable, reconfigurable, adjustable, adaptable, etc.) seating arrangement for optimizing or otherwise improving the positioning of one or more attendants within the body of ambulance 10 relative to the patient being transported. The seating system generally comprises one or more attendant support structures (e.g., seats, platforms, chairs, benches, etc.) and a guide system (e.g., runner, track, rail, etc.). The one or more attendant support structures cooperate with the guide system to allow an attendant to selectively adjust his or her positioning within the body while remaining secured to the attendant support structure. This is achieved by selectively moving the attendant support structure along the guide system and locking it in place once a desired position is reached. The movable characteristics of the seating system facilitate flexibility in how and where a patient is treated while being transported.

Before discussing the details of ambulance 10, it should be noted at the outset that references to "front," "back," "rear," "upper," "lower," "right," and "left" in this description are merely used to identify the various elements as they are oriented in the FIGURES, with "front," "back," and "rear" being relative to the direction of travel of ambulance 10. These terms are not meant to limit the element which they describe, as the various elements may be oriented differently in various applications.

Also, while the seating system disclosed herein is illustrated and described in conjunction with an ambulance in the form of an automobile, it should be noted that the seating system is suitable for use with a variety of emergency response-type vehicles, including both automotive and non-automotive applications. For example, firefighting vehicles, anti-terrorist vehicles, military vehicles, rescue or ambulance helicopters, or any other vehicle in which it would be beneficial to have a movable seating system.

Further, for the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

Referring to FIG. 1, ambulance 10 is shown according to an exemplary embodiment. Ambulance 10 generally comprises a vehicle support structure, shown as a chassis 12, an operator compartment, shown as a operator cab 16, and a body, shown as a box 18. Chassis 12 provides a framework or base for operator cab 16 and box 18, as well as other components of ambulance 10 (e.g., wheels, a suspension, a drivetrain, etc.). Chassis 12 extends along a longitudinal axis of ambulance 10 between a front end 15 and a rear end 17.

Operator cab 16 is provided generally towards front end 15 and provides an enclosure or area suitable to receive an operator and/or occupant of the vehicle. Although not shown, operator cab 16 includes controls associated with the manipulation of ambulance 10 (e.g., steering controls, throttle controls, etc.) and may optionally include controls associated with one or more auxiliary components of ambulance 10 (e.g., sirens, emergency lighting, etc.).

Box 18 is provided rearward of operator compartment 16 at rear end 17 of chassis 12. Box 18 provides a workspace or treatment room available to an attendant to administer aid or otherwise attend to a patient being transported by ambulance 10. According to an exemplary embodiment, box 18 is defined at its outer periphery by a pair of spaced-apart lateral side walls 20 (e.g., a first or right-hand side wall and a second or left-hand side wall, etc.) that extend in a direction that is substantially parallel to the longitudinal axis of chassis 12, a pair of spaced-apart end walls 22 (e.g., a first or front end wall and a second or rear end wall, etc.) that extend in a direction substantially perpendicular to side walls 20, a base or floor 24, and a headliner or ceiling 26. Ceiling 26 and floor 24 extend in directions that are substantially parallel to each other and substantially perpendicular to side walls 20 and end walls 22. According various alternative embodiments, side walls 20, end walls 22, floor 24, and/or ceiling 26 may each include raised and/or recessed portions, linear and/or curvilinear surfaces, etc. depending on the particular application.

Figure 2:
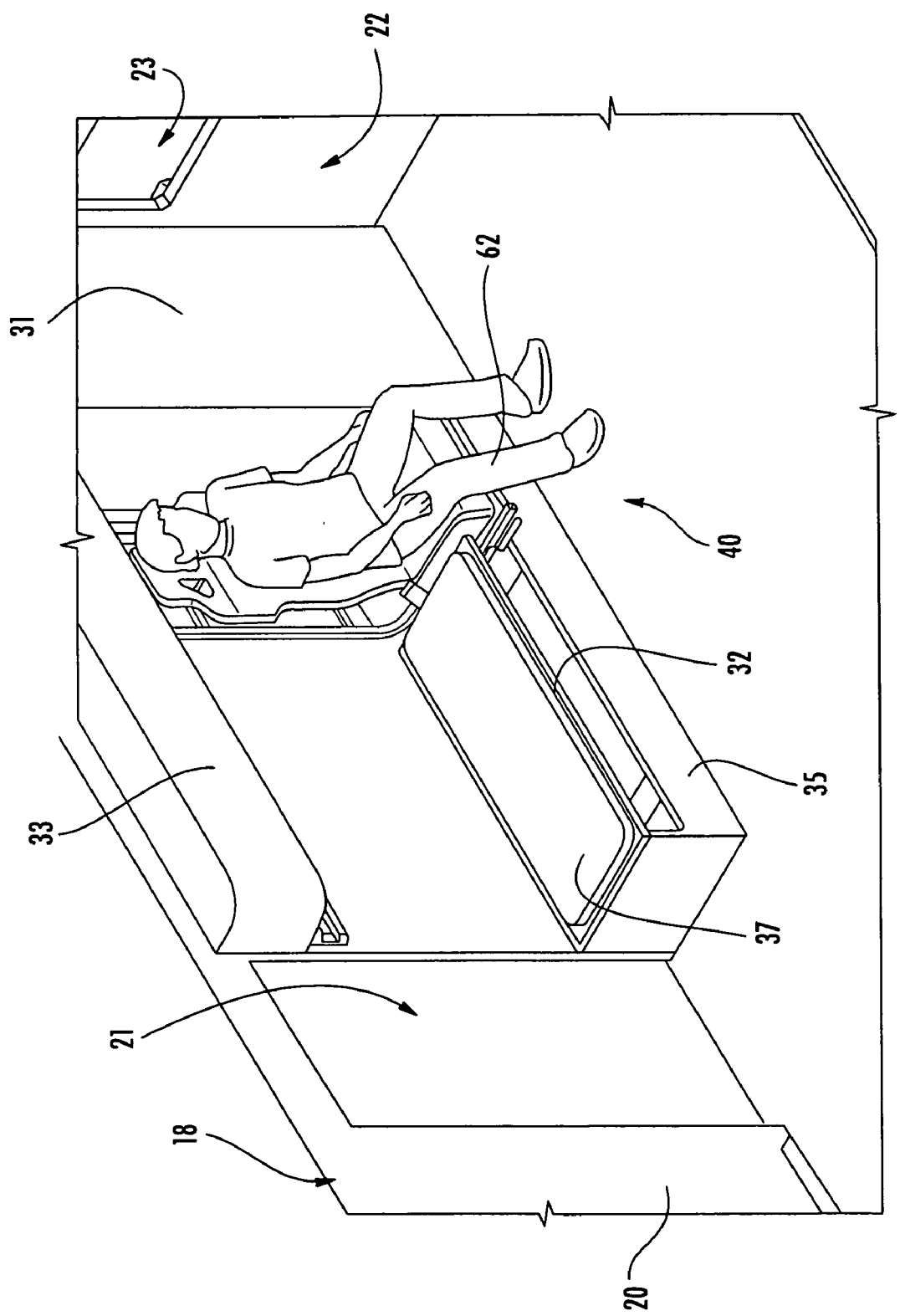
FIG. 2 is an isometric view of an interior of the ambulance of FIG. 1 showing a seating system according to an exemplary embodiment, the seating system having a crew bench shown in a use position.

Box 18 further comprises one or more openings which facilitate ingress to and egress from an interior of box 18. According to the embodiment illustrated, box 18 includes a first or rear opening 23 in end wall 22 (shown in FIG. 2) and a second or side opening 21 in a side wall 20. While not shown, an opening between operator cab 16 and box 18 may also be provided. According to various alternative embodiments, box 18 may include any number of openings positioned in any of a number of positions for facilitating the ingress to and egress from box 18.

It should be noted that while box 18 is shown as being a separate structure supported closely adjacent to operator cab 16, according to various alternative embodiments, box 18 may be integrally formed with operator cab 16. For example, ambulance 10 may be in the form of a van wherein the operator cab is integrally formed with the body portion.

Referring to FIGS. 2 through 5, the interior of box 18 is shown according to an exemplary embodiment. The interior of box 18 may have any of a variety of configurations depending upon the particular application of the emergency response vehicle and may be configured to contain or otherwise support any of a number of attendants, patients, storage units, and/or articles. According to an exemplary embodiment, the interior of box 18 is configured to enclose or otherwise support a patient support structure (e.g., examination table, bed, stretcher, gurney, etc.), shown as a cot 28, one or more storage areas for providing compartmental storage for various articles (e.g., supplies, instrumentation, equipment, etc.), and a system for movably securing, retraining, and/or supporting one or more attendants, shown as a seating system 40. Note that an overhead storage area has been removed in FIGS. 4 and 5 to more clearly illustrate seating system 40.

Figure 4:
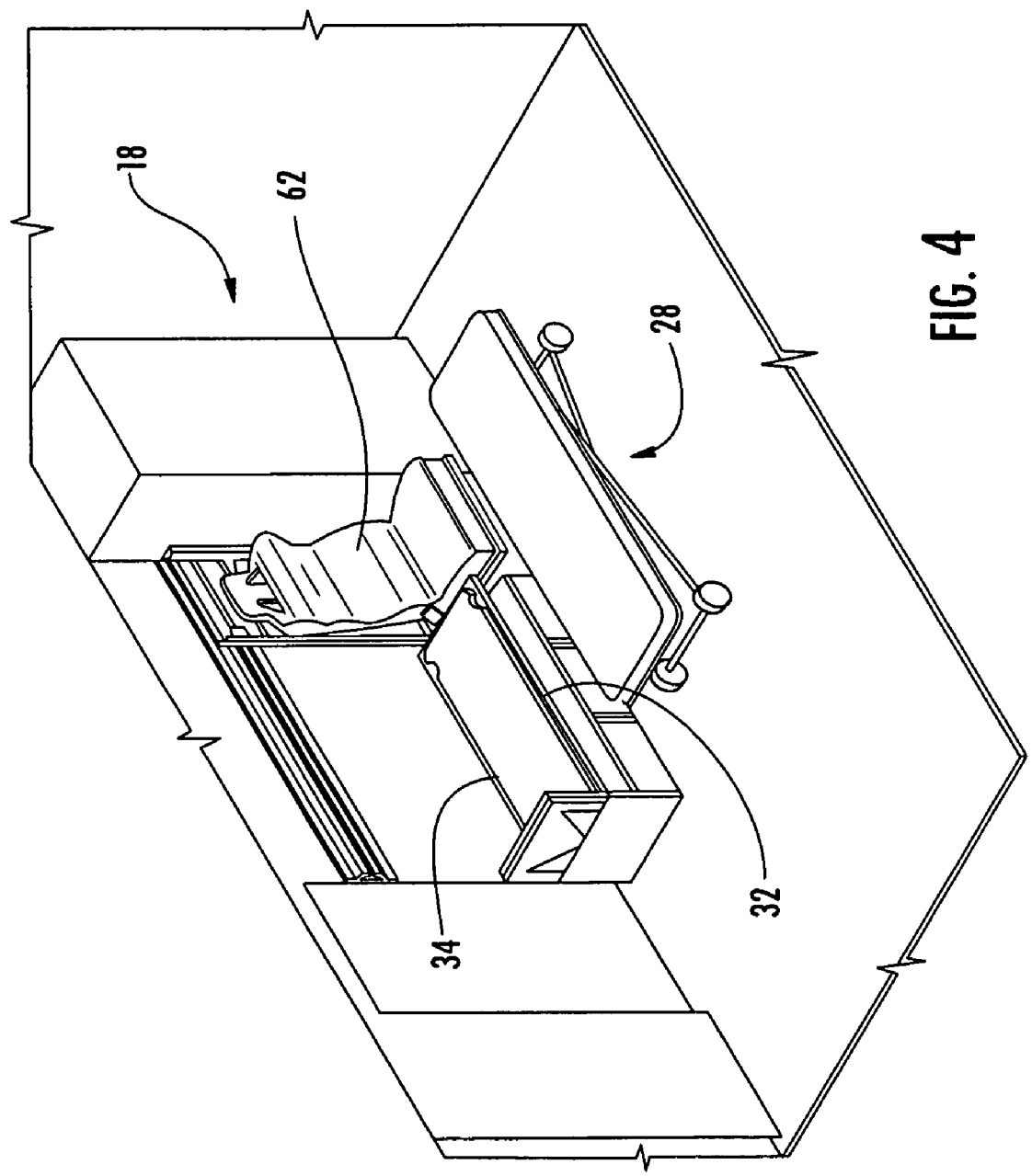
FIG. 4 is another isometric view of the interior the ambulance of FIG. 1 showing the crew bench in a use position and the interior without an overhead storage area.
Figure 5:
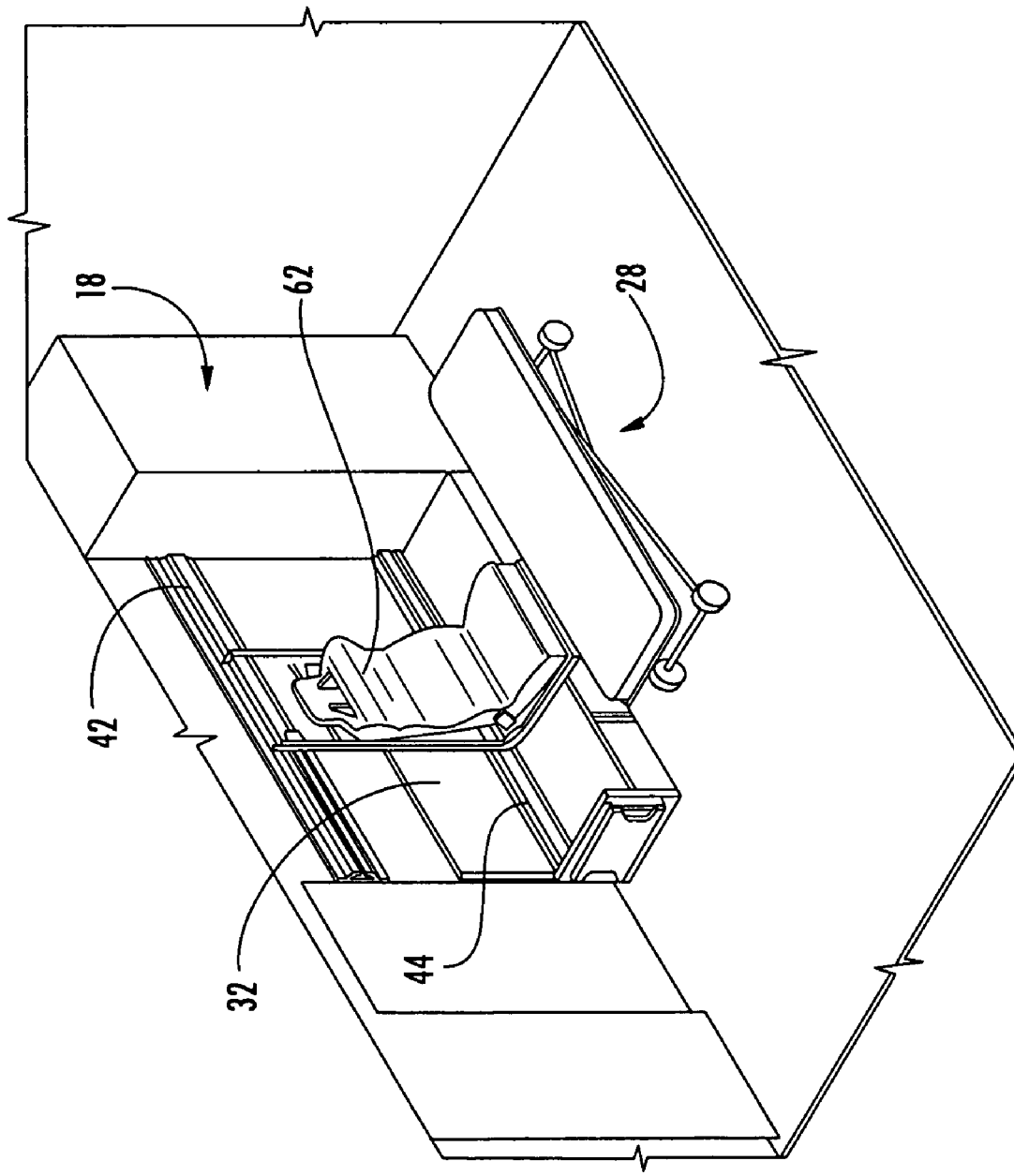
FIG. 5 is another isometric view of the interior of the ambulance of FIG. 1 showing the crew bench in a stowed position and the interior without an overhead storage area.
Figure 6:
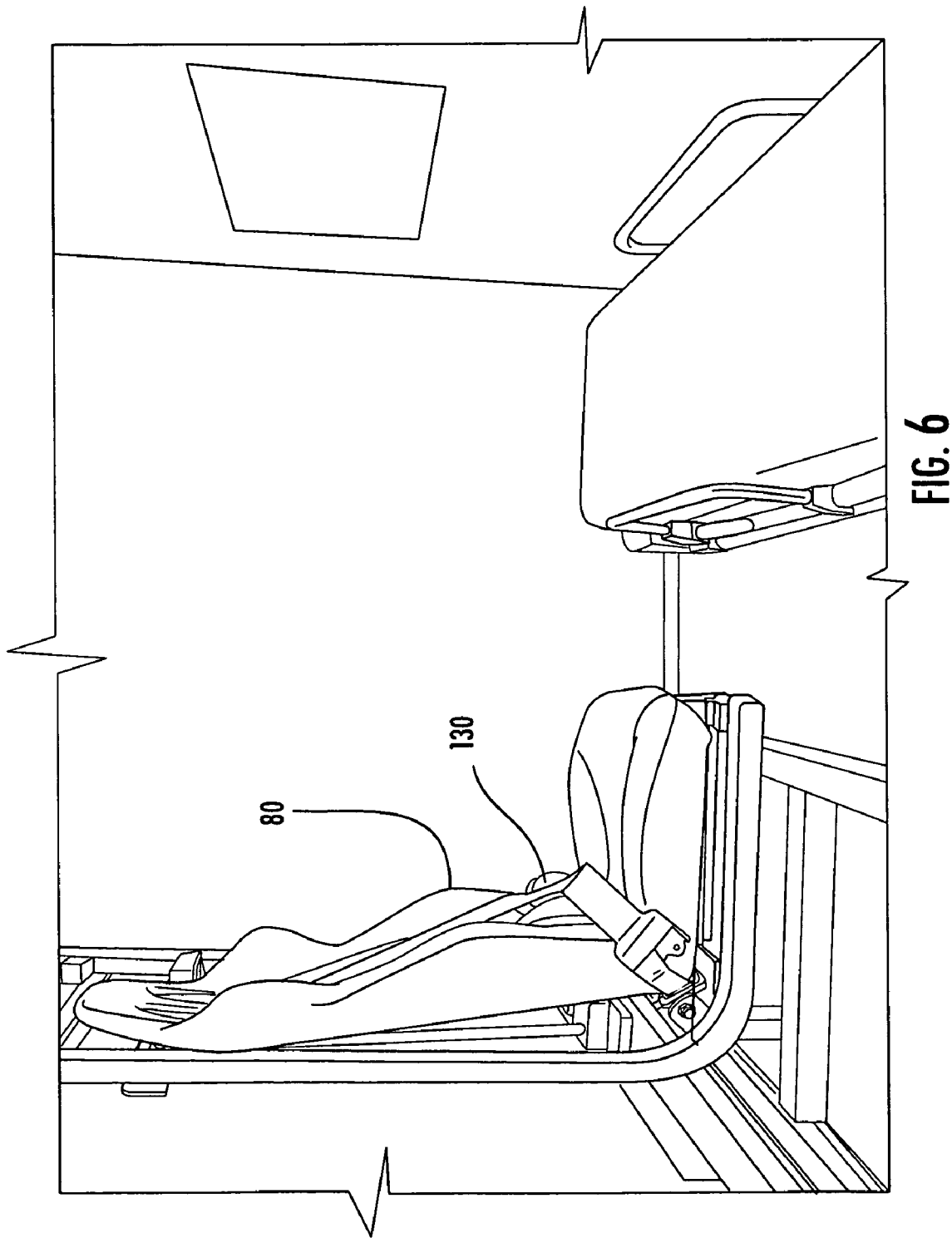
FIG. 6 is a front view of the seating system of FIG. 2 showing a main attendant's chair in a retracted position.
Figure 7:
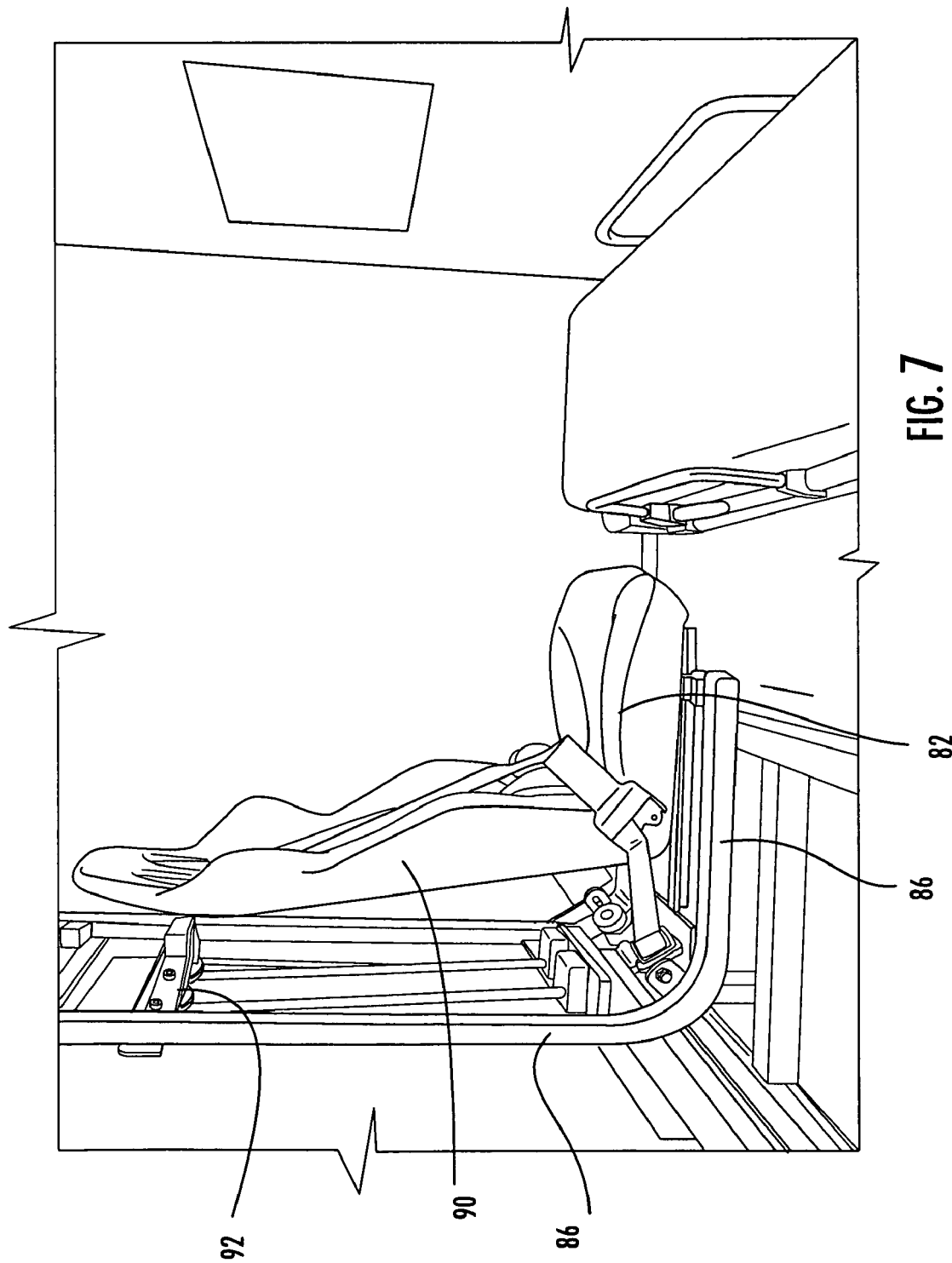
FIG. 7 is a front view of the seating system of FIG. 2 showing the main attendant's chair in an extended position.

Referring to FIGS. 4 and 5 in particular, cot 28 provides a structure suitable for receiving a typical patient and supporting such patient in one or more positions (e.g., a seated position, a supine position, etc.) within ambulance 10 while the patient is being transported. Within box 18, cot 28 may be supported and locked in a variety of positions and/or orientations. For example, cot 28 is shown as extending in the fore and aft direction of ambulance 10 along the centerline of the vehicle. According to another exemplary embodiment, cot 28 may extend in the fore and aft direction along an interior side wall of box 18 (shown in FIGS. 6 and 7). According to another exemplary embodiment, cot 28 may extend transversely in relation to the longitudinal axis of ambulance 10. Cot 28 may be a component of ambulance 10, or alternatively may simply be an apparatus used in conjunction with ambulance 10. Cot 28 may be fixedly (e.g., permanently, etc.) coupled within box 18, but preferably is releasably coupled within box 18 so that patient support structure 28 can be repositioned, reconfigured, and/or removed from box 18.

Referring back to FIGS. 2 and 3, box 18 includes one or more storage areas allowing for the compartmentalized organization and/or storage of various articles (e.g., tools, supplies, blankets, instrumentation, equipment, etc.). According to an exemplary embodiment, these storage areas are provided as storage units (e.g., modules, compartments, etc.) that are supported within the interior of body 18. The storage units may be in the form of shelving, drawers, cabinets, bins, or any other suitable storage receptacle. The number, size, type and/or location of the storage units may vary depending on the particular application.

According to the embodiment illustrated, ambulance 10 comprises a rear storage unit 31, an upper or overhead storage unit 33, and a lower or floor storage unit 35. Rear storage unit 31, overhead storage unit 33 and floor storage unit 35 each provide compartmentalized storage for articles that may be useful to an attendant of ambulance 10. Rear storage unit 31 is shown as outwardly projecting from side wall 20 into the interior of box 18 and extending between ceiling 26 and floor 24. Overhead storage unit 33 is shown as being supported forward of rear storage unit 31 and extending in the fore and aft direction of ambulance 10 along side wall 20. Floor storage unit 35 is shown as being supported forward of rear storage unit 31 and substantially below overhead storage unit 33.

Rear storage unit 31, overhead storage unit 33, and floor storage unit 35 are all shown as being disposed along the side wall 20 having side opening 21. More specifically, rear storage unit 31, overhead storage unit 33, and floor storage unit 35 are all shown as being disposed between the rear end wall 22 and side opening 21 along side wall 20. It should be noted that while not shown, one or more storage units may be provided along one or more of the other walls defining box 18. According to various alternative embodiments, any number and/or type of storage unit may be provided within box 18. Such storage units may be provided at any of a number orientations or positions within box 18. According to further alternative embodiments, it may be desirable not to have any storage units within box 18.

Referring generally to FIGS. 2 through 7, seating system 40 is shown according to an exemplary embodiment. Seating system 40 allows an attendant to, effectively administer aid to a patient being transported regardless of the positioning of cot 28 within box 18 and/or the area on the patient requiring aid by allowing the attendant to selectively adjust his or her position within box 18 while remaining secured in seating system 40. For example, seating system 40 is configured to selectively move in the fore and aft direction of ambulance 10 which may allow an attendant to treat a patient with a head injury just as effectively as a patient with a foot injury (see FIGS. 4 and 5). Further, seating system 40 is configured to selectively move transverse to the fore and aft direction which may allow an attendant to treat a patient when cot 28 is locked-in along the centerline of box 18 just as effectively as when cot 28 is locked-in along the side wall of box 18 (see FIGS. 6 and 7).

Seating system 40 comprises one or more attendant support structures (e.g., EMT seats, chairs, etc.) and a guide system. The one or more attendant support structures can be selectively moved in one or more predefined directions so that an attendant can access different areas within box 18 (e.g., to access different parts of a patient on patient support structure, etc.) while remaining seated, restrained or otherwise supported in the attendant support structure. According to the embodiment illustrated, the one or more attendant support structures are in the form of a first attendant's chair, shown as a main attendant's chair 62. According to various alternative embodiments, any number of attendant support structures, in any suitable form, may be provided.

Figure 8:
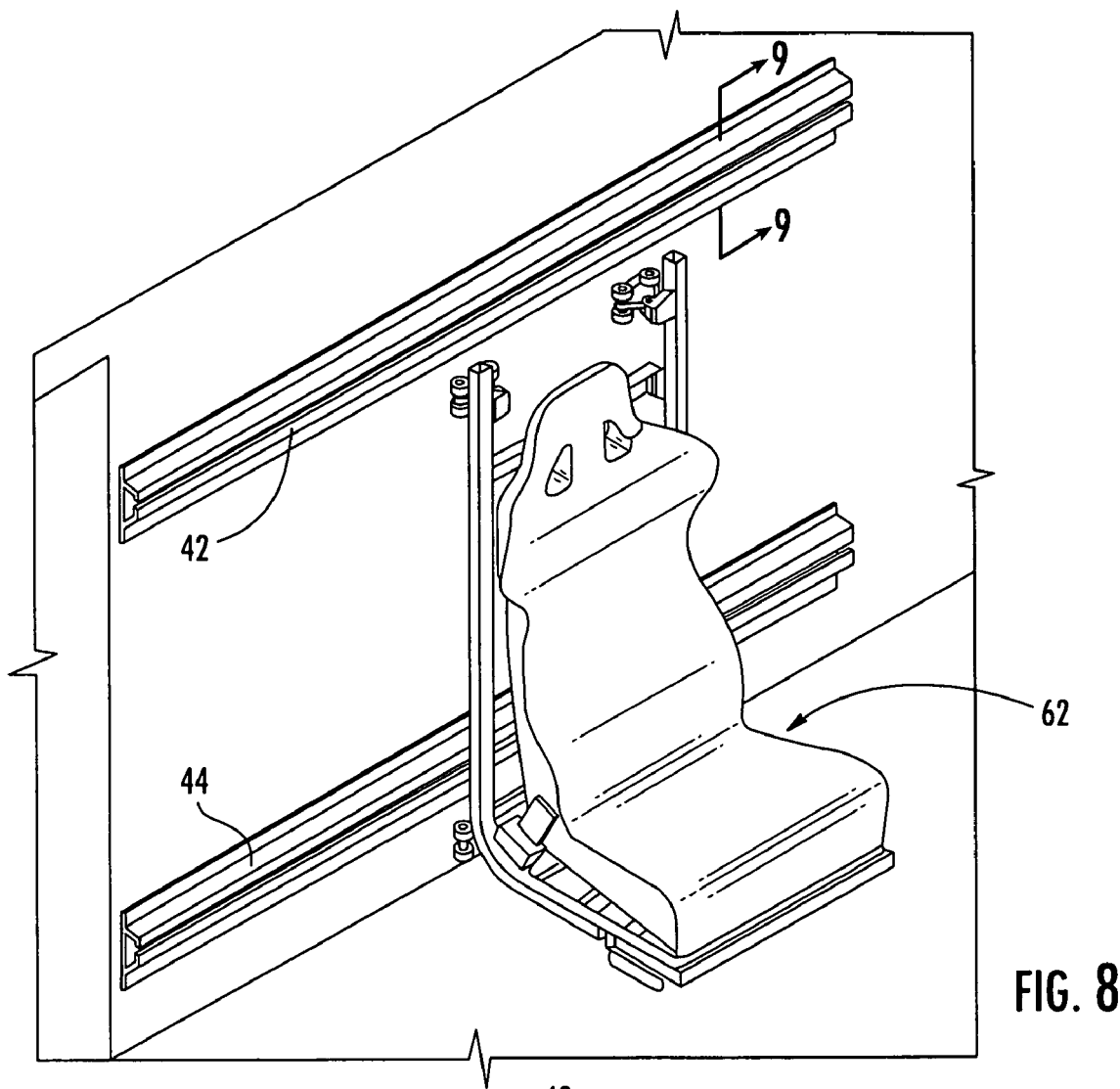
FIG. 8 is a partially exploded view of the seating system of FIG. 2 showing a carriage assembly exploded from a track according to an exemplary embodiment.
Figure 10:
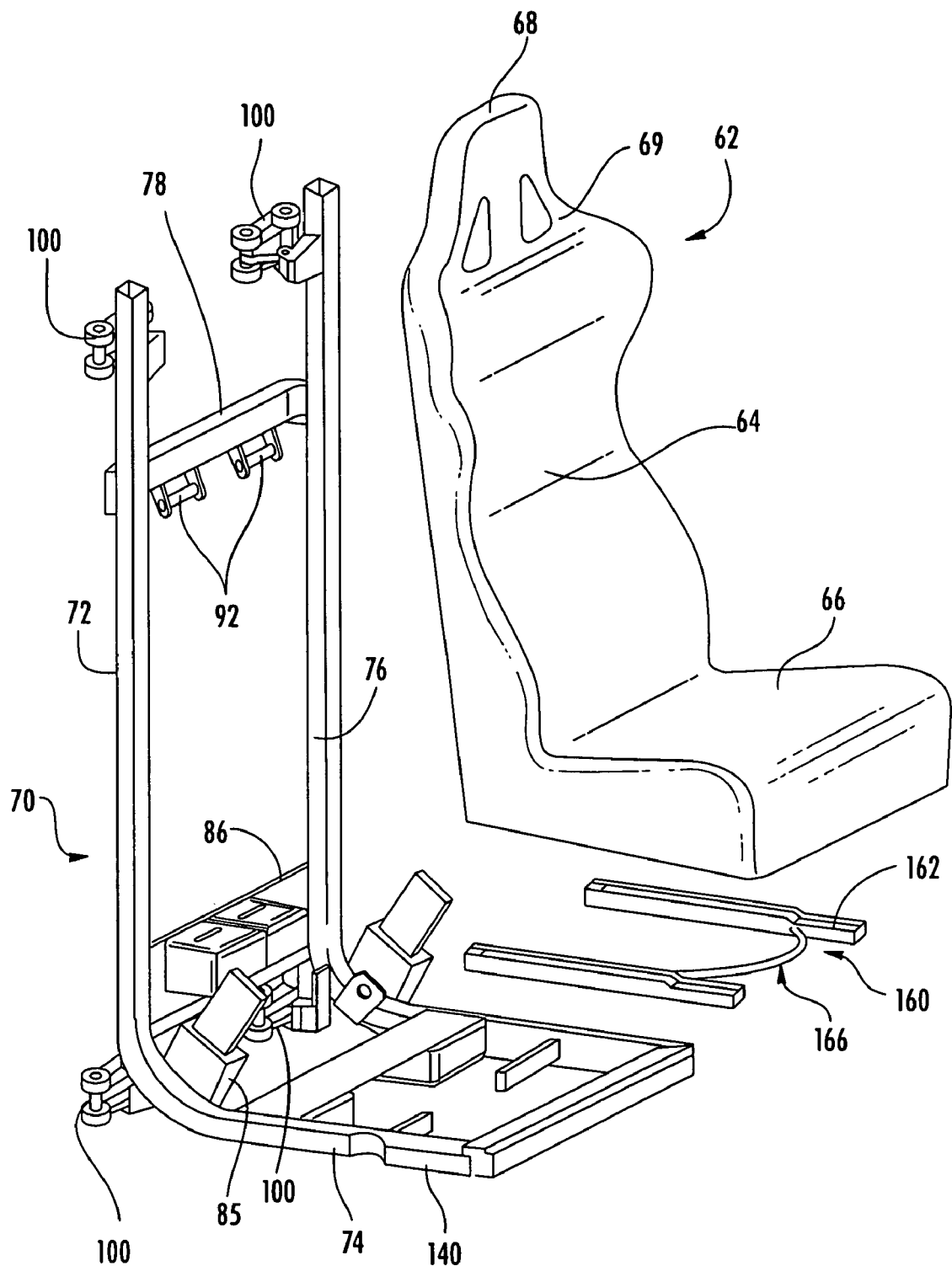
FIG. 10 is a partially exploded view of the carriage assembly of FIG. 8.

Main attendant's chair 62 is a structure that is configured to provide a secure place for an attendant to sit within box 18 while ambulance 10 is in transit and/or when administering aid to a patient. Referring to FIGS. 8 and 10, main attendant's chair 62 generally comprises a first portion (e.g., backrest, etc.), shown as a seat back 64, and a second portion (e.g., seat base, etc.), shown as a seat bottom 66. Seat back 64 is configured to support the back of the attendant and extends upward from seat bottom 66, which in turn is configured provide a surface for the attendant to sit on. According to an exemplary embodiment, main attendant's chair 62 further comprises a headrest 68. Headrest 68 is configured to support the head and/or neck of the attendant and may comprise one or more openings 69 for receiving components of an occupant restraint system 80 (shown in FIG. 6) as detailed below. According to an exemplary embodiment, headrest 68, seat back 64 and seat bottom 66 are formed as a single one-piece unitary body. According to various alternative embodiments, one or more of headrest 68, seat back 64 and seat bottom 66 may be separate bodies. For example, seat back 64 may be separated from seat bottom 66 so that the angular positioning of seat back 64 can be adjusted (e.g., tilted, etc.) relative to seat bottom 66.

To restrain or otherwise secure an attendant to main attendant's chair 62 while ambulance 10 is in transit, occupant restraint system 80 is provided. Referring back to FIGS. 6 and 7, occupant restraint system 80 is in the form of a 4-point safety belt system. The 4-point safety belt system comprises lap belts 82, shoulder belts 90, a retractors 86, and a latching device 130. Two lap belts 82 extend from retractors 86 supported at opposite lateral sides of seat bottom 66. Lap belts 82 have free ends that are releasably coupled to each other via latching device 130 (e.g., clasp, clip, buckle, etc.). Two shoulder belts 90 extend from retractors 86 supported behind seat back 64. Shoulder belts 90 pass through guides 92 supported near headrest 68 before extending through openings 69 in headrest 68. The free ends of shoulder belts 90 are coupled to lap belts 82 on either side of latching device 130, for example, by being sewn or stitched to lap belts 82. According to various alternative embodiments, any other suitable occupant restraint system may be used including, but not limited to, a three-point system (i.e., one lap belt and one shoulder belt running diagonally across the chest), a two-point system (i.e., one lap belt), or a suitable harness system.

To facilitate the guided movement of main attendant's chair 62 within box 18, the guide system is provided. According to an exemplary embodiment, the guide system comprises one or more runners, tracks or rails, shown as a first track 42 and a second track 44 supported within box 18 to which main attendant's chair 62 is movably coupled. It should be noted that the guide system may include any number of tracks or rails extending in any of a number of directions within box 18, and/or any other configuration suitable for providing the guided movement of an attendant support structure.

According to an exemplary embodiment, first track 42 and second track 44 are coupled to side wall 20 of box 18, with first track 42 being spaced-apart from and supported above second track 44. First track 42 is supported near ceiling 26 of box 18, while second track 44 is supported near floor 24 of box 18. First track 42 extends in a direction that is substantially parallel to second track 44, with both first track 42 and second track 44 extending in the fore and aft direction of ambulance 10. According to another exemplary embodiment, first track 42 and second track 44 may be supported along one or more of end walls 22 (e.g., a wall separating box 18 from operator cab 16) and extend in a direction substantially perpendicular to the fore and aft direction of ambulance 10.

Referring to the embodiment illustrated in FIGS. 4 and 5, first track 42 is shown being supported closely adjacent to an underside surface of overhead storage unit 33, while second track 44 is shown being supported closely adjacent to a top surface of floor storage unit 35. First track 42 and second track 44 extend continuously in the fore and aft direction of ambulance 10 between rear storage unit 31 and first side opening 21.

Figure 9:
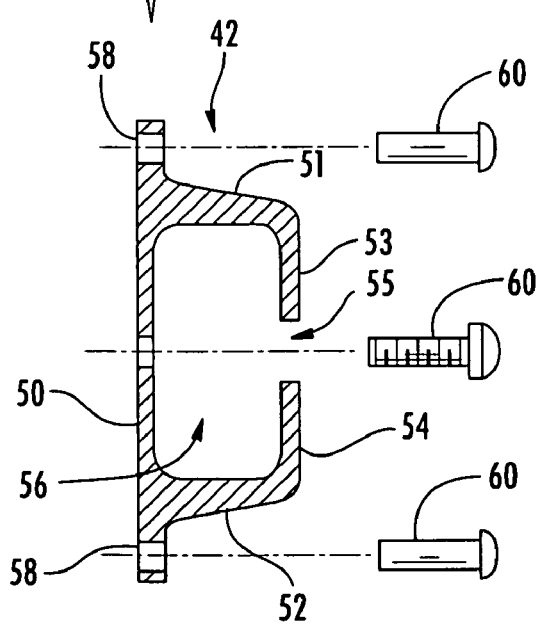
FIG. 9 is a cross sectional view of the track taken along the line 9-9 in FIG. 8.

Referring now to FIGS. 8 and 9, the configuration of first track 42 and second track 44 are shown according to an exemplary embodiment. First tracks 42 and second track 44 are both rigid linear members which define a recess or channel that provides a passageway for the movable coupling of main attendant's chair 62. For the sake of brevity, the configuration of the tracks will only be described with reference to first track 42 with the understanding that a similar structure is provided for second track 44.

First track 42 is shown as having a substantially C-shaped cross section defined by a base 50, a first wall 51, a second wall 52, a third wall 53, and a fourth wall 54. First wall 51 and second wall 52 outwardly extend from base 50 in a direction substantially perpendicular to base 50. Third wall 53 and fourth wall 54 outwardly extend from first wall 51 and second wall 52 respectively in a direction substantially parallel to base 50 and are separated by an opening 55 (e.g., slot, gap, etc.). Base 50, first wall 51, second wall 52, third wall 53 and fourth wall 54 cooperate to form a channel 56 that is configured to receive and provide for the reciprocal movement of a follower as detailed below.

First track 42 further comprises a pair of flanges 58 which extend from base 50 proximate to first wall 51 and second wall 52. Flanges 58, along with base 50, include one or more apertures or openings 59 configured to receive a fastener, shown as a bolt 60, to couple first tracks 42 within box 18. Openings 59 in base 50 are spaced-apart in a longitudinal direction of first track 42 and are provided in series of predetermined positions. Such openings 59, in combination with bolts 60 received therein, at least partially define the locking locations along first track 42 for main attendant's chair 62. According to an exemplary embodiment, openings 59 are provided every 6 to 12 inches along first track 42 thereby providing locking locations for main attendant's chair 62 every 6 to 12 inches. For example, in one embodiment, openings 59 are provided approximately every 9 inches along first track 42. As detailed below, the bolts 60 configured to engage the openings 59 in base 50 have a projection or operating head sufficiently sized and shaped to function as a stop for the follower.

According to various alternative embodiments, any of a number of suitable cross-sections may be provided for first track 42 and second track 44 depending upon the corresponding structure of the follower adapted engage the tracks. According to further alternative embodiments, the cross-section of first track 42 may vary from the cross-section of second track 44. Further still, first track 42 and second track 44 may be coupled to a structure within box 18 using any suitable technique (e.g., a welding process, mechanical fasteners, etc.). Further still, openings 59 in base 50 may be provided at any distance apart and such distances may be consistent along first track 42 or may vary. Further still, openings 59 in base 50 may be eliminated if an alternative latching mechanism (not utilizing fasteners received therein as stops) is used.

To facilitate the movable coupling of main attendant's chair 62 to first track 42 and second track 44, an intermediate support structure (e.g., support interface, slider assembly, etc.) is provided. According to an exemplary embodiment, the intermediate support structure is in the form of a support frame, shown as a carriage frame 70. Referring to FIG. 10, carriage frame 70 provides a generally rigid base for main attendant's chair 62 and comprises a first section (e.g., first frame, backrest frame, etc.), shown as a seat back portion 72 and a second frame (e.g., second frame, seat base frame, etc.), shown as a seat bottom portion 74.

Seat back portion 72 extends upward in a substantially vertical direction and is configured to support seat back 64, while seat bottom portion 74 extends outward in a substantially horizontal direction and is configured to support seat bottom 66. According to an exemplary embodiment, seat back portion 72 and seat bottom portion 74 are integrally formed as a single unitary body. The single unitary body comprises one or more rails 76 and one or more cross members 78 (e.g., supports, braces, etc.). Rails 76 and/or cross members 78 may be configured to support various components of seating system 40. For example, rails 76 and cross members 78 are shown as supporting various components of occupant restraint system 80. Specifically, rails 76 and cross members 78 are both configured to support retractors 86, while cross members 78 are configured to support guides 92.

According to various alternative embodiments, seat back portion 72 and seat bottom portion 74 may be separate structures that are subsequently mounted relative to each other. According to further alternative embodiments, the intermediate support structure may only be configured to support one of seat back 64 and seat bottom 66. According to further alternative embodiments, the intermediate support structure may be eliminated and main attendant's chair 62 may be coupled directly to first track 42 and second track 44.

For the exemplary embodiments utilizing an intermediate support structure, such as carriage frame 70, the combination of main attendant's chair 62 and the intermediate support structure is referred to generally herein as a carriage assembly. To facilitate the movable coupling of the carriage assembly to first track 42 and second track 44, a follower (e.g., reciprocating member, slider, bearing surface, rolling device, etc.), shown as a trolley 100 is provided. Trolley 100 is adapted to engage first track 42 and/or second track 44 in a reciprocatingly slidable (e.g., rolling, etc.) relationship to allow main attendant's chair 62 to be selectively translatable about first track 42 and second track 44.

Still referring to FIG. 10, trolley 100 is shown as being coupled to the carriage assembly, and more specifically, as being directly coupled to carriage frame 70. According to one exemplary embodiment, the carriage assembly utilizes four trolleys 100 to engage the combination of first track 42 and second track 44 with two trolleys 100 engaging first track 42 and two trolleys 100 engaging second track 44. According to an exemplary embodiment, trolleys 100 are rotatably coupled to seat back portion 72 of carriage frame 70. For example, a pivot rod, shown as a clevis pin 94, is used to couple trolleys 100 to rails 76 of seat back portion 72. Rotatably coupling trolleys 100 to carriage frame 70 may facilitate relatively smooth movement of the carriage assembly along first track 42 and second track 44 and/or may allow for the guide system to have uneven or curvilinear portions (shown in FIG. 15).

According to various alternative embodiments, trolleys 100 any number of trolleys 100 may be movably or fixedly coupled to carriage frame 70 and/or coupled directly (either movably or fixedly) to main attendant's chair 62. For example, three trolleys 100 may be used in an attempt to reduce manufacturing expenses (e.g., two trolleys 100 on second track 44 and on trolley 100 on first track 42, etc.).

Figure 11:
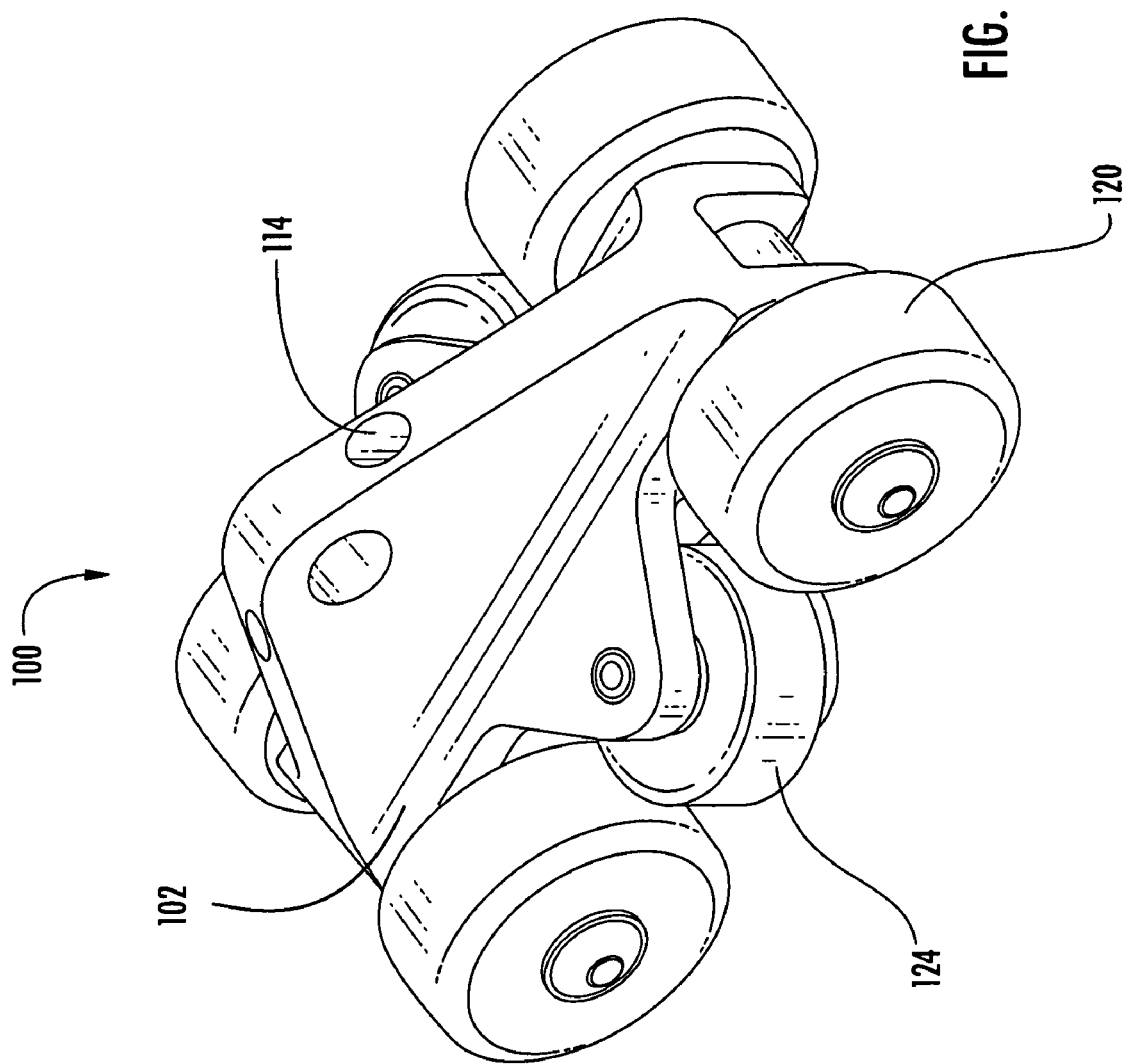
FIG. 11 is an isometric view of a trolley of the carriage assembly of FIG. 8.
Figure 12:
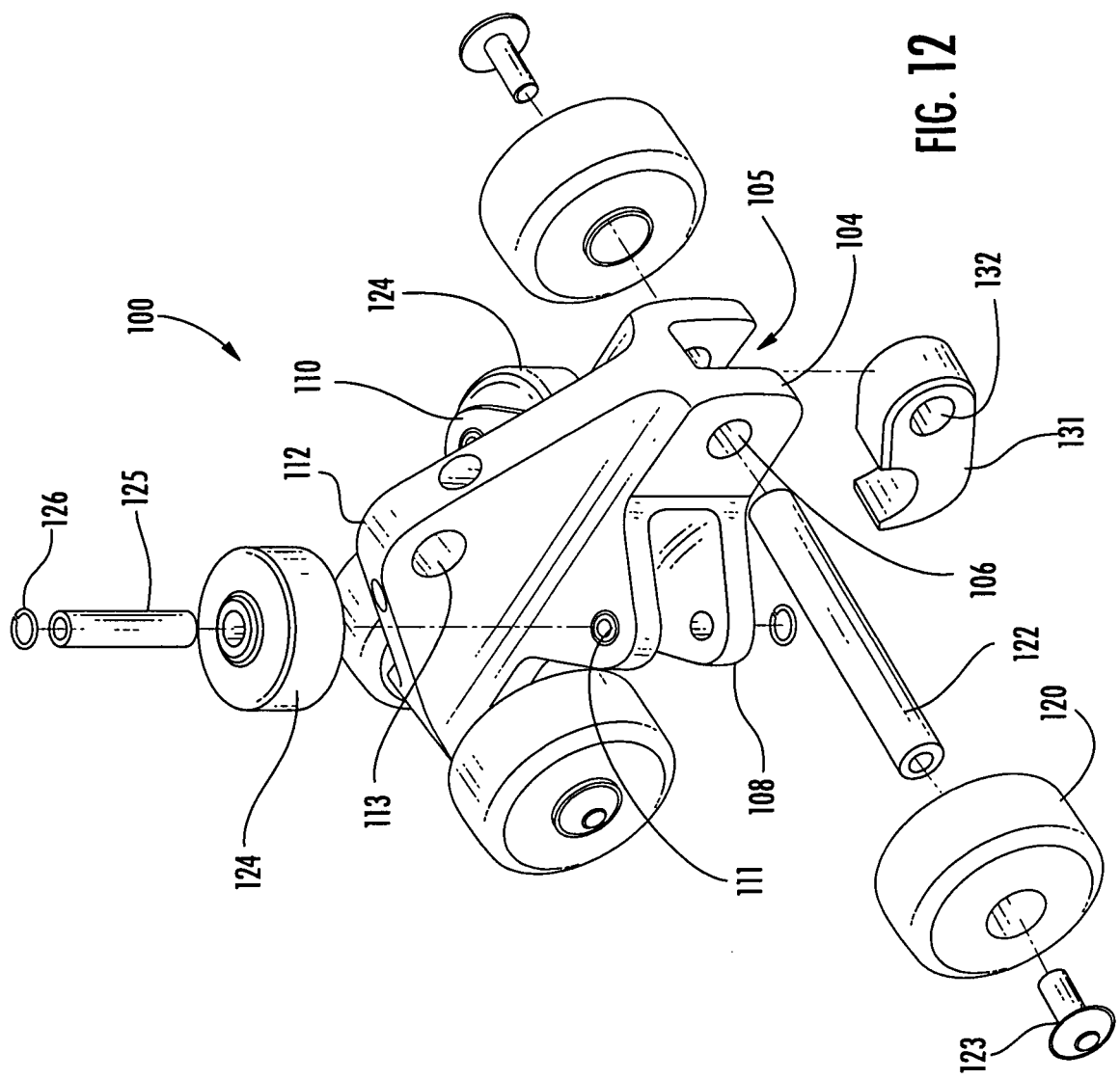
FIG. 12 is a partially exploded view of the trolley of FIG. 11.
Figure 13:
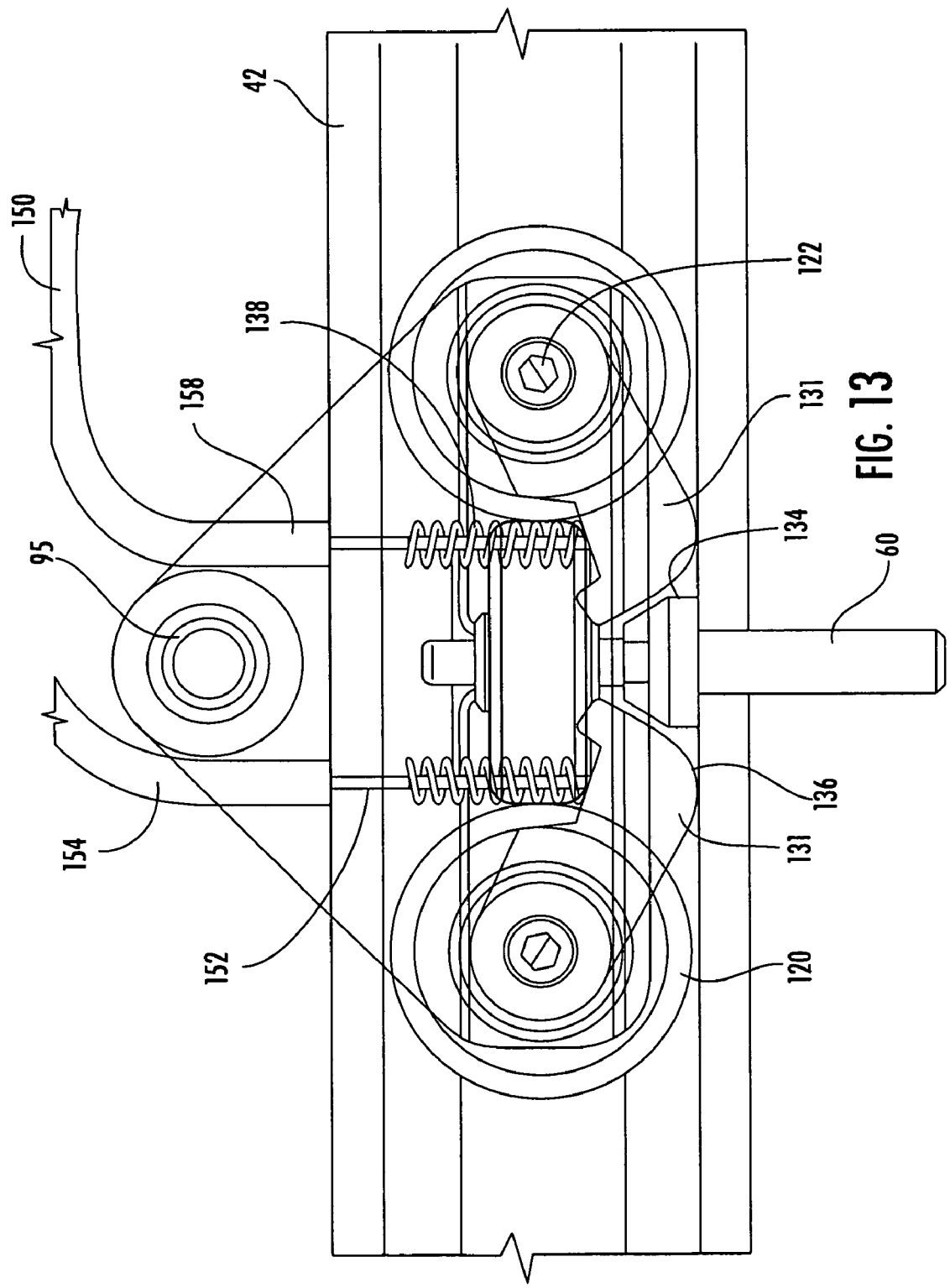
FIG. 13 is an elevation view of the trolley of FIG. 11 and the track with a portion of the trolley shown in phantom for clarity.
Figure 14:
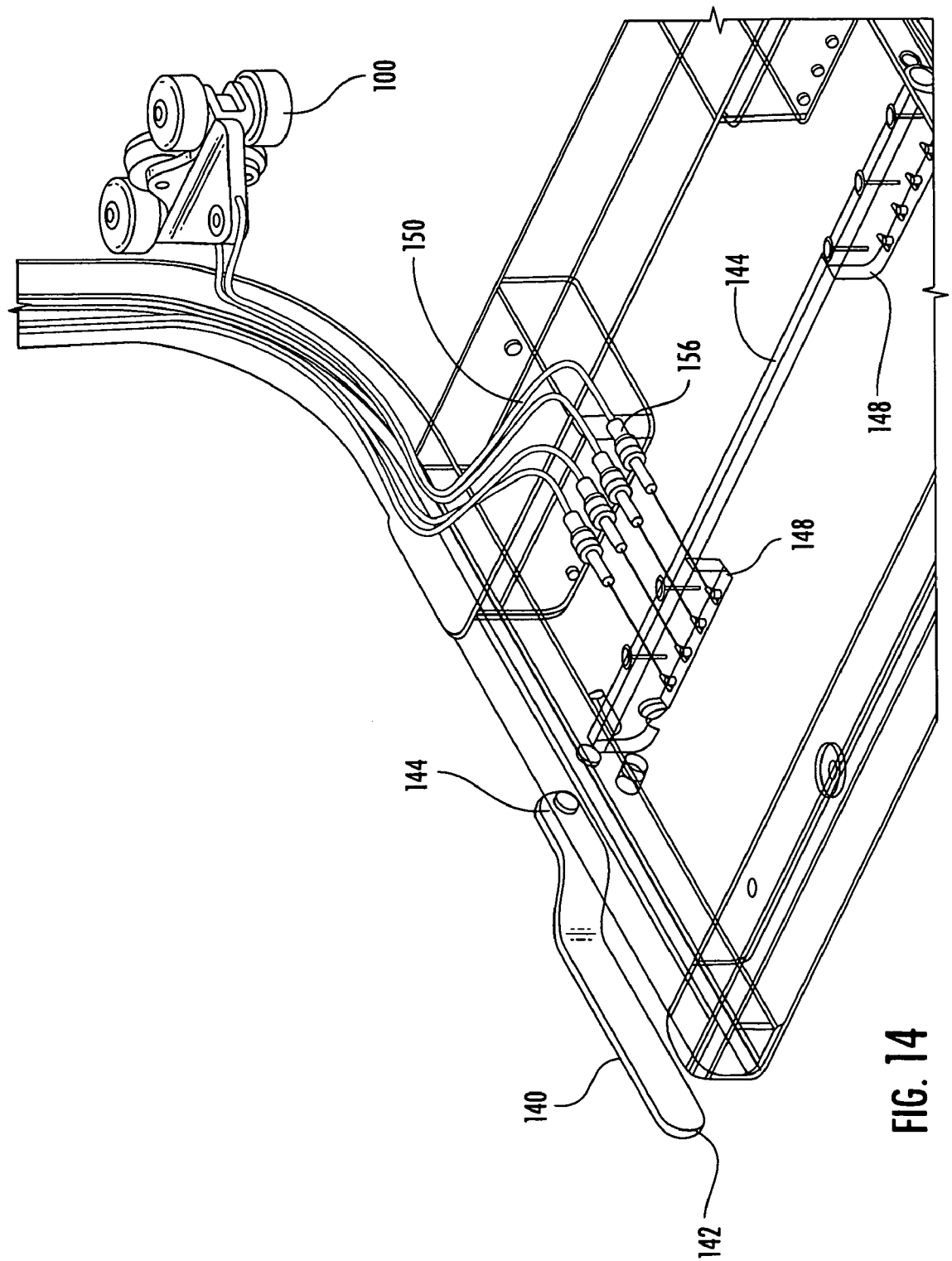
FIG. 14 is an isometric view of a portion of the seating system showing a seat adjuster according to an exemplary embodiment.

Referring to FIGS. 11 through 13, trolleys 100 comprise a base, one or more track engaging elements, one or more positioning elements, and one or more latching elements. The base, shown as a main body 102, is configured to provide a relatively rigid structure to which the other components of trolley 100 can be mounted. According to an exemplary embodiment, main body 102 extends in a longitudinal direction between a first end and a second end and defines a recess or channel 105. Openings 106 are provided at the first and second ends for coupling the one or more track engaging elements and the one or more latching elements to the main body 102. Supported at a first surface of main body 102 is a first bracket or flange 108. Supported at an opposite second surface of main body 102 is a second bracket or flange 110. Supported at an intermediate third surface of main body 102 is a third bracket or flange 112. First flange 108, second flange 110 and third flange 112 each extend outward from main body 102, with third flange 112 extending in a direction that is generally perpendicular to first flange 108 and second flange 110.

First flange 108 and second flange 110 cooperate to define a generally U-shaped area that is configured to receive the one or more positioning elements. To facilitate the coupling of the one or more positioning elements within the U-shaped area, first flange 108 and second flange 110 each include openings 111 that are configured to receive a fastener for coupling the one or more track engaging elements to main body 102 (shown as an axle 125 configured to engage and idler wheel 124). Third flange 112 extends outward from main body 102. Third flange 112 is configured to extend though opening 55 in first track 42 and second track 44 when trolleys 100 are engaged with the tracks, and as such, has a thickness that is less than the width of opening 55. Third flange 112 includes an opening 113 configured to receive a fastener, shown as clevis pin 95, for coupling trolley 100 to carriage frame 70. As detailed below, third flange 112 further includes one or more openings 114 configured to receive a cable (e.g., wire, rod, spring, etc.) used as a conduit to selectively release the carriage assembly from a latched or locked position.

The one or more track engaging elements (e.g., reciprocating elements, wheels, casters, rollers, sliders, bearing surfaces, etc.), shown as rolling elements 120, provide for the longitudinal movement of trolley 100 relative to first track 42 and second track 44. Rolling elements 120 are configured to be received within channel 56 of first track 42 and second track 44 and have a diameter substantially equivalent to the distance between base 50 and third portion 53 and/or fourth portion 54. To reduce the chance of binding, the diameter of may be slightly less than the distance between base 50 and third portion 53 and/or fourth portion 54. According to one exemplary embodiment, rolling elements 120 are coupled to main body 102 at pivot shafts or axles 122 extending through openings 106 with one or more fasteners, shown as a bolt 123.

The one or more positioning elements (e.g., spacers, bearing surfaces, alignment structures, etc.), shown as idler wheels 124 are configured to maintain trolley 100 in a desired vertical position as trolley 100 moves in a longitudinal direction (e.g., horizontal direction, etc.) along first track 42 and second track 44. Idler wheels 124 are configured to be rotatably coupled to body 102 of trolley 100 at first flange 108 and second flange 110, and are configured to be received with channel 56 of first track 42 and second track 44. When received within channel 56, idler wheels 124 are configured to engage first track 42 and second track 44 along first portion 51 and second 52 portion. According to an exemplary embodiment, idler wheels 124 are coupled to main portion 104 about axles 125 extending through openings 111 with one or more fasteners, shown as a clip 126.

The one or more latching devices (e.g., detents, fingers, catches, etc.), shown as latches 131, are configured to restrict or otherwise influence the movement of trolley 100 along first track 42 and second track 44. According to an exemplary embodiment, latches 131 are configured to locked or otherwise latch trolley 100 (and thereby main attendant's chair 62) in one or more positions along first track 42 and second track 44. Latches 131 move between a first or latched position, wherein movement of trolley 100 along first track 42 and second track 44 is restricted, and a second or released position, wherein trolley 100 can move freely along first track 42 and second track 44.

According to an exemplary embodiment, trolley 100 includes two latches 131 having portions that are configured to engage the operating heads of fasteners 60. Latch 131 includes an opening 132, an end face 134 (e.g. abutment surface, etc.), and a track engaging face 136. Axle 122 is received within opening 106 of main body 102 and opening 132 of latch 131 for rotatably coupling latch 131 to main body 102. End face 134 is provided at an end generally opposite of opening 132 and is configured to engage an operating head of bolt 60 projecting from base 50 within channel 56 when in the latched position. Track engaging surface 136 is generally adjacent to end face 134 and is configured to engage first track 42 or second track 44.

Referring to FIG. 13 in particular, trolley 100 further includes one or more biasing elements (e.g., springs, etc.), shown as a coil spring 138, to urge or bias latches 131 into the latched position. According to an exemplary embodiment, one coil 138 is provided for each latch 131. Coil spring 138 is received with main body portion 102 and has a first end acting upon main body portion 102 and a second end acting upon latch.131. Coil spring 138 applies a force to latch 131 which biases latch 131 into the latched position shown. In this position, with end face 134 generally in contact with the operating head of bolt 60, a typical force acting in the longitudinal direction of first track 42 and second track 44 will not be able to overcome the force acting on latch 131, and as such, trolley 100 will maintain its fixed position on the track. When latch 131 is moved to the released position (e.g., by actuating a user interface, etc.), coil spring 138 is compressed until track engaging surface 136 is substantially clear of bolt 60 so that latch 131 can pass over bolt 60 thereby allowing trolley 100 to move along first track 42 and second track 44.

To selectively release latch 131 from the latched position, a first release system 140 is provided. First release system 140 is operatively coupled to latches 131 and allows an attendant to selectively release trolleys 100 (and thereby main attendant's chair 62) from the latched position to allow trolleys 100 to move along first track 42 and second track 44. According to an exemplary embodiment, first release system 140 is a mechanical system requiring the manual manipulation to actuate the system. According to various alternative embodiments, the first release system may be any other suitable type of release system including, but not limited to, an electronic or electrical (including wireless, etc.) system.

According to an exemplary embodiment, first release system 140 comprises a user interface (e.g. push-button, lever, dial, switch, etc.), shown as handle 142 and mechanism for transferring the input at handle 142 to trolleys 100, shown as one or more cables 150. Handle 142 is supported at a location that is relatively convenient for an attendant to access while seated in main attendant's chair 62. According to an exemplary embodiment, handle 142 is supported along rail 76 of seat bottom portion 74 of carriage frame 70. A shaft 144 is provided to movably couple handle 142 to rail 76. To release trolleys 100 from the latched position, an attendant selectively rotates handle 142 about shaft 144 (e.g., by pulling up on handle 142, etc.).

One or more mounting devices, shown as plates 148, are supported at shaft 144 between rails 76 and are configured to receive first free ends of cables 150. According to an exemplary embodiment, each plate 148 receives cables 150 for two trolleys 100. According to the embodiment illustrated, each plated 148 receives four cables 150 (i.e., two cables 150 for each trolley 100). Cables 150 are flexible cables (e.g., bowden cables, etc.) comprising an inner cable 152 and an outer housing 154. Each cable 150 extends between a first free end or handle end 156 and a second free end or trolley end 158. At handle end 156, outer housings 154 are coupled to carriage frame 70 and inner cables 152 are coupled to plates 148. At trolley end 158, outer housings 154 are received by upper portions 115 of cable openings 114 and inner cables 152 run through middle portions 116 and lower portions 117 of cable openings 114 and are coupled to latches 131.

The rotation of shaft 144, due to the actuation of handle 142, causes inner cable 152 to pull on latch 131 with a force sufficient to overcome the biasing force of coil spring 138. Once the biasing force of coil spring 138 is overcome, and latch 131 is pulled away from the operating head of bolt 60, trolley 100 is released from the latched position and the carriage assembly is free to move along first track 42 and second track 44. To return to the latched position, the attendant simply releases handle 142 and continues to move the carriage assembly along first track 42 and second track 44 until latches 131 engage the operating head of another bolt 60. A portion of the first latch 131 engaging the operating head of bolt 60 will act as a camming surface to allow such latch 131 to be moved outward until the operating head of bolt 60 engages end face 134 of the other latch 131. Once the operating head of bolt 60 engages end face 134 of that latch 131, the other latch 131 will be biased inward so as to trap the operating head of bolt 60 between the two end faces 134.

The guide system detailed above was shown as a guide system which allows an attendant to move in a fore and aft direction of ambulance 10. Depending on the placement of cot 28 in box 18 (e.g., along side wall 20 or a centerline of box 18) or the needs of the patient, it may be desirable for an attendant to move main attendant's chair 62 in a direction that is substantially transverse or perpendicular the fore and aft direction of ambulance 10 while remaining secured to main attendant's chair 62. According to an exemplary embodiment, with reference to FIGS. 6 and 7, such movement is relative to carriage frame 70. To provide such movement, a seat adjuster 160 is provided.

Referring to FIG. 10, seat adjuster 160 is similar to seat adjustment systems used in automobiles for controlling the positioning of a seat in a fore and aft direction of the automobile. Seat adjuster 160 comprises a guide track, shown as a pair of rails sections 162, a locking device (not shown) and a user interface, shown as a towel bar 166. Each rail section 162 includes a first track portion which is fixedly coupled relative to main attendant's chair 62 and a second track portion which is fixedly coupled relative to carriage frame 70. The first track portion moves relative to the second track portion to allow the positioning of main attendant's chair 62 to be adjusted.

According to the embodiment illustrated, rail sections 162 are generally perpendicular to first track 42 and second track 44 and generally between and parallel with rails 76 of carriage frame 70. The locking device is configured to releasably engage at least one of the rail sections 162 to secure the first track portion to the second track portion, thereby securing main attendant's chair 62 in a desired position. The locking device is configured to move between a first or locked position in which main attendant's chair 62 is generally fixed and a second or released position in which main attendant's chair 62 is allowed to move outward relative to first track 42 and second track 44 and carriage frame 70. Towel bar 166 is provided to allow an attendant to selectively move locking device 164 between a locked position and a released position. According to an exemplary embodiment, towel bar 166 is provided under a front edge of main attendant's chair 62.

According to an exemplary embodiment, the range of movement for main attendant's chair 62 along rail sections 162 is between approximately 3 inches and 10 inches, and in one embodiment is approximately 7 inches. According to various alternative embodiments, main attendant's chair 62 may have a range of movement in such direction distances greater than or less than those provided above. According to further alternative embodiments, any of a number of suitable mechanism may be used for seat adjuster 160.

Referring back to FIGS. 2 through 5, ambulance 10 further comprises a support platform, shown as a crew bench 32, within box 18. Crew bench 32 may provide one or more functions within box 18. For example, crew bench 32 may provide an additional seating area for attendants within box 18. Further, crew bench 32 may provide a lid or cover for a storage area within floor storage unit 35. Further still, crew bench 32 may provide an additional support area for a patient being transported.

Figure 3:
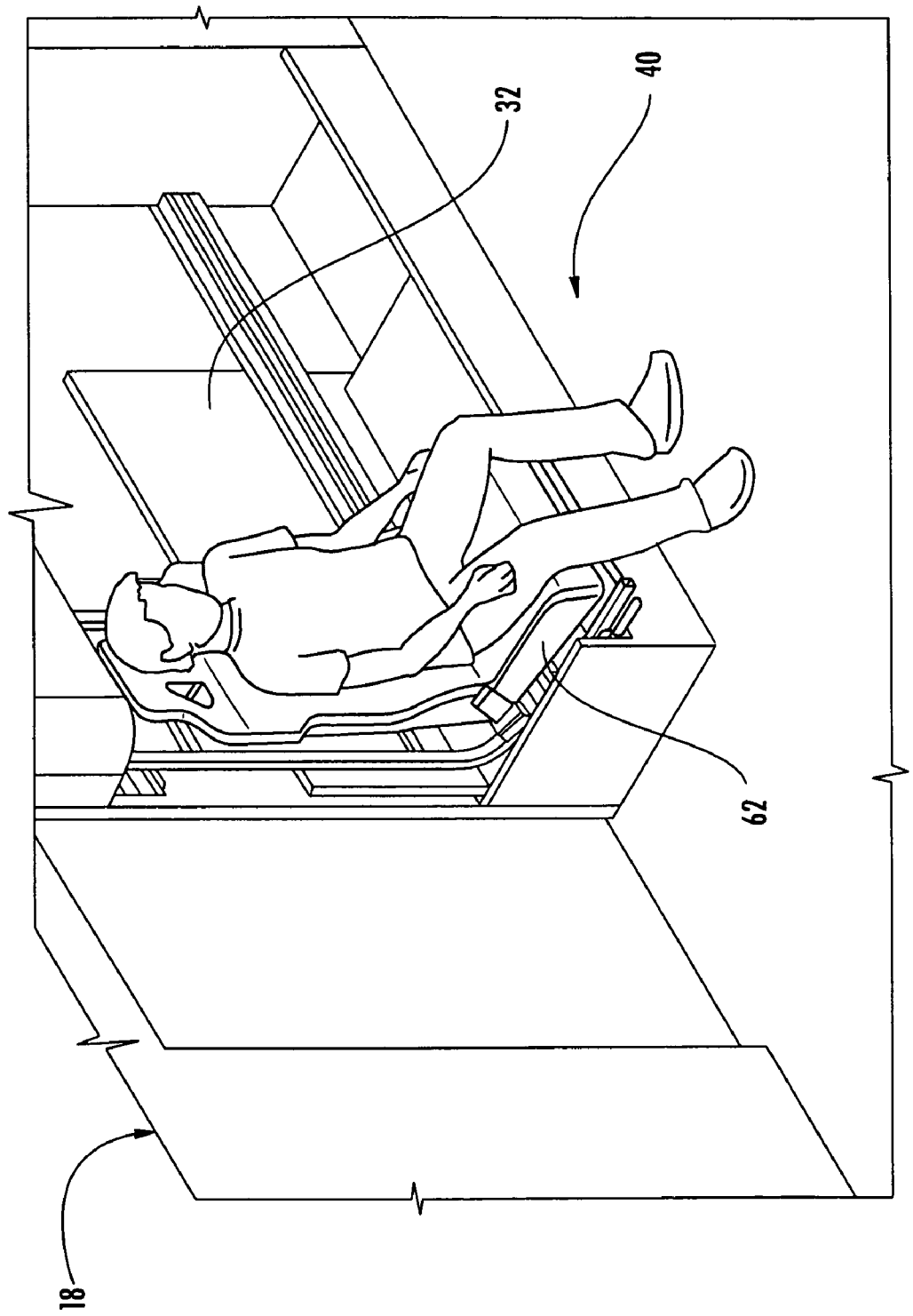
FIG. 3 is an isometric view of the interior of the ambulance of FIG. 1 showing the crew bench in a stowed position.

According to an exemplary embodiment, crew bench 32 is movably supported within box 18 and is configured to move between a first or use position (shown in FIGS. 2 and 4) and a second or stowed position (shown in FIGS. 3 and 5). According to the embodiment illustrated, crew bench 32 is movably supported within box 18 by being pivotally coupled to side wall 20 via a hinge 34. For such an embodiment, crew bench 32 is moved between the use position and the stowed position by being rotated about hinge 34. In the use position, crew bench 32 provides a generally horizontal surface that may be at least partially supported by floor storage unit 35. A cushion 37 may be provided on top of crew bench 32 to provide comfort to a person seated thereon. To achieve the stowed position, crew bench 32 is rotated until it is substantially vertical and mating with to side wall 20. While not shown, a latching or locking mechanism may be provided to secure crew bench 32 in the stowed position.

Crew bench 32 is shown as being supported adjacent to a lateral side of main attendant's chair 62. According to an exemplary embodiment, crew bench 32 at least partially prevents or blocks the reciprocal movement of main attendant's chair 62 along the entire length of first track 42 and second track 44 when in the use position. However, when crew bench 32 is moved to the stowed position, main attendant's chair 62 is configured to occupy a position previously being occupied by crew bench 32 or at least pass through a space previously occupied by crew bench 32. To allow for such movement, second track 44 is provided below or under hinge 34 and the depth of crew bench 32 is less than the distance between first track 42 and second track 44. As such, crew bench 32 is supported with a space defined by first track 42 and second track 44 when stowed.

Figure 15:
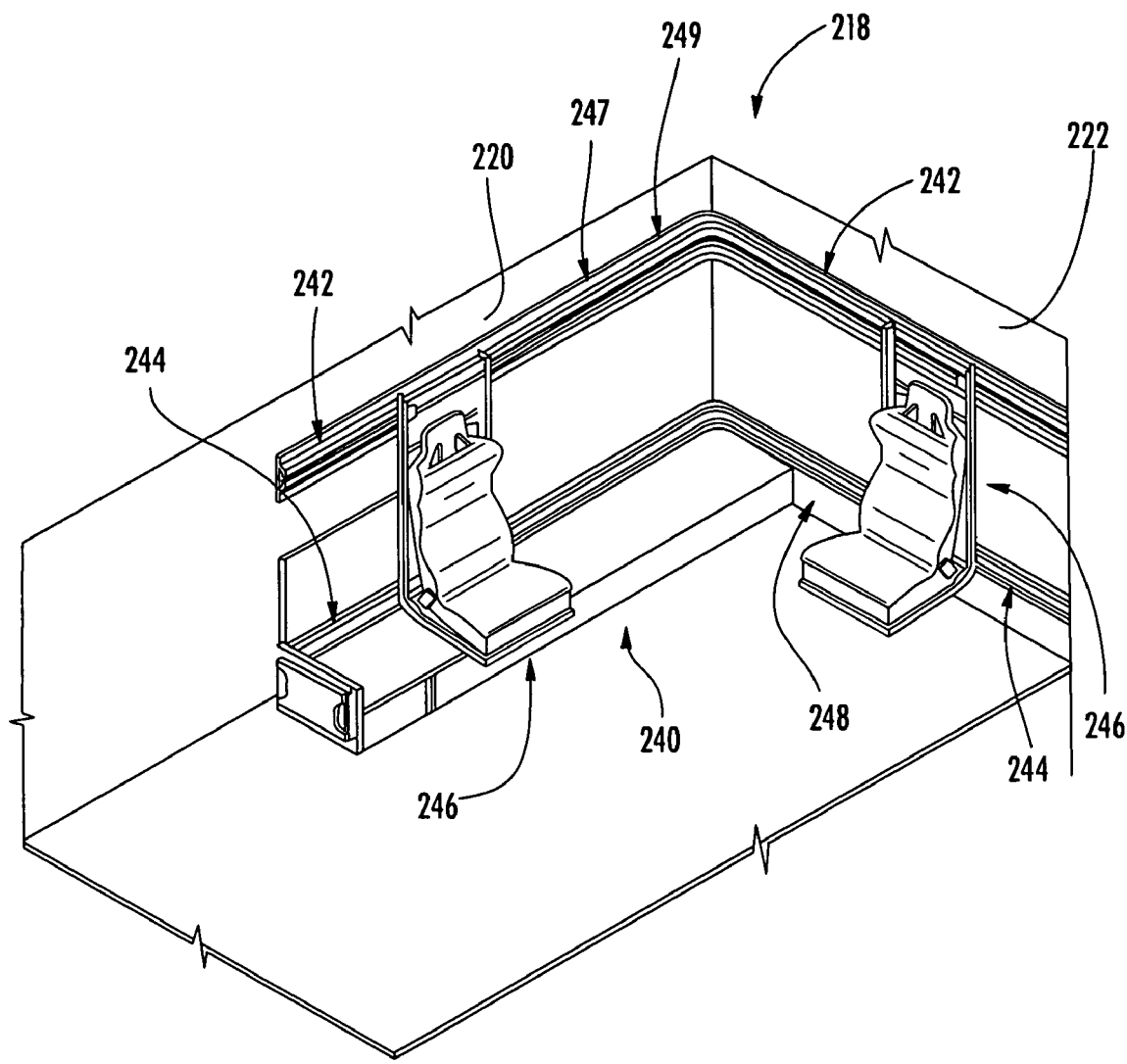
FIG. 15 is an isometric view of a seating system according to another exemplary embodiment with tracks that extend along two side walls.

Referring to FIG. 15, a box 218 and seating system 240 are shown according to an alternative embodiment. For such an embodiment, seating system 240 comprises tracks 242, 244 that extend continuously between an end wall 222 and a side wall 220. Tracks 242, 244 have a first portion 247 along a side wall 220, a second portion 248 along an end wall 222, and a curved portion 249 that connects first portion 247 and second portion 248. Carriage assembly 246 is configured to travel along tracks 242, 244. According to one exemplary embodiment, one carriage assembly 246 is provided. According to other exemplary embodiments, two or more carriage assemblies may be provided. For the embodiment illustrated in FIG. 15, end wall 222 may be a wall separating box 218 from operator cab 16, a wall provided at the rear of box 218, and/or any other wall extending transversely within box 18.

The construction and arrangement of the elements of the ambulance and the seating system as shown in the illustrated and other exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited herein. For example, elements shown as integrally formed may be constructed of multiple parts or elements, the position of elements may be reversed or otherwise varied, and the nature or number of discrete elements or positions may be altered or varied. It should be noted that the elements and/or assemblies of the seating system may be constructed from any of a wide variety of materials that provide sufficient strength or durability in any of a wide variety of colors, combinations and suitable materials. Other substitutions, modifications, changes and omissions may be made in the design, operating conditions and arrangement of the preferred and other exemplary embodiments without departing from the scope of the present inventions.

The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the present inventions as expressed herein.

What is claimed is:

1. An emergency response vehicle comprising:
a body defined at least in part by a side wall;
a guide track extending substantially parallel with the side wall;
an attendant support structure movably coupled to the guide track, the attendant support structure comprises a chair having a backrest and a seat base; and
a platform supported at a lateral side of the attendant support structure and configured to move between a first position and a second position,
wherein the attendant support structure is selectively movable about the guide track and is configured to occupy a space previously occupied by the platform when the platform is moved to the second position.

2. The emergency response vehicle of claim 1 wherein the guide track comprises a track member coupled to the side wall via a fastener.

3. The emergency response vehicle of claim 2 further comprising a latching device for selectively latching the attendant support structure along the track member.

4. The emergency response vehicle of claim 3 wherein the latching device is configured to engage the fastener for selectively latching the attendant support structure along the track member.

5. The emergency response vehicle of claim 1 wherein the chair is supported by a carriage that is coupled to the guide track between the chair and the guide track.

6. The emergency response vehicle of claim 5 further comprising a seat adjuster coupled between the seat base and the carriage that allows the chair to be adjusted relative to the side wall in a direction that is substantially perpendicular to the side wall while a seat occupant is sitting in the chair.

7. The emergency response vehicle of claim 5 wherein the attendant support structure further comprises an interface supported at the carriage, wherein actuation of the interface allows the chair to move about the guide track.

8. The emergency response vehicle of claim 5 wherein the attendant support structure further comprises at least one follower supported at the carriage, the at least one follower configured to engage the guide track.

9. The emergency response vehicle of claim 8 wherein the at least one follower includes a rolling element configured to engage a channel defined by the guide track.

10. The emergency response vehicle of claim 1 wherein the platform is supported at a substantially horizontal orientation when in the first position and at a substantially vertical orientation when in the second position.

11. The emergency response vehicle of claim 1 wherein the platform functions as a seat bench when in the first position.

12. The emergency response vehicle of claim 1 further comprising a storage unit supported within the body and at least partially under the platform, wherein the platform functions as a cover for the storage unit so that the storage unit is closed when the platform is in the first position and open when the platform is in the second position.

13. The emergency response vehicle of claim 12 wherein the platform conceals a storage area within the storage unit when in the first position.

14. The emergency response vehicle of claim 12 further comprising a second storage unit, the second storage unit being supported adjacent to a headliner of the body, the guide track being supported below the second storage unit.

15. The emergency response vehicle of claim 1 further comprising an operator compartment supported forward of the body.

16. The emergency response vehicle of claim 1 wherein the side wall defines an opening for facilitating ingress and egress to the body, and wherein the guide track extends continuously between the opening and a rear wall of the body.

17. The emergency response vehicle of claim 1 wherein the attendant support structure further comprises an occupant restraint for securing a seat occupant to the chair.

18. The emergency response vehicle of claim 1 wherein the platform is supported about a hinge that is substantially parallel to the side wall.

19. The emergency response vehicle of claim 18 wherein the platform is rotatable about the hinge between the first position and the second position.

20. The emergency response vehicle of claim 19 wherein the platform is supported at a relatively horizontal orientation at the first position and at a relatively vertical orientation at the second position.

21. The emergency response vehicle of claim 19 wherein the platform is configured to be manually rotated by a user between the first position and the second position.

22. The emergency response vehicle of claim 19 wherein the guide track comprises a first track member and a second track member, the first track member being supported below the hinge, the second track member being supported above the hinge.

23. The emergency response vehicle of claim 22 wherein the second track member is offset in a vertical direction from the first track member a distance that is greater than a depth of the platform.

24. The emergency response vehicle of claim 1 wherein the platform is supported closely adjacent to the lateral side of the attendant support structure.

* * * * *

UNITED STATES PATENT AND TRADEMARK OFFICE
CERTIFICATE OF CORRECTION

PATENT NO. : 7,621,580 B2  Page 1 of 1
APPLICATION NO. : 11/503386
DATED : November 24, 2009
INVENTOR(S) : Randjelovic et al.

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 322 days.

Delete the phrase "by 322 days" and insert -- by 428 days --

Signed and Sealed this

Seventeenth Day of August, 2010

David J. Kappos
*Director of the United States Patent and Trademark Office*